US011369231B2

(12) United States Patent
Fortin

(10) Patent No.: US 11,369,231 B2
(45) Date of Patent: Jun. 28, 2022

(54) LADLE INCLUDING EXTERIOR SWEEPING SQUEEGEE ARM

(71) Applicant: Sara Fortin, Merrick, NY (US)

(72) Inventor: Sara Fortin, Merrick, NY (US)

( * ) Notice: Subject to any disclaimer, the term of this patent is extended or adjusted under 35 U.S.C. 154(b) by 0 days.

(21) Appl. No.: 16/615,294

(22) PCT Filed: Aug. 6, 2019

(86) PCT No.: PCT/US2019/045212
§ 371 (c)(1),
(2) Date: Nov. 21, 2019

(87) PCT Pub. No.: WO2020/197581
PCT Pub. Date: Oct. 1, 2020

(65) Prior Publication Data
US 2022/0015581 A1   Jan. 20, 2022

Related U.S. Application Data

(60) Provisional application No. 62/824,361, filed on Mar. 27, 2019.

(51) Int. Cl.
*A47J 43/00* (2006.01)
*A47J 43/28* (2006.01)
*A47G 21/04* (2006.01)

(52) U.S. Cl.
CPC ............ *A47J 43/282* (2013.01); *A47G 21/04* (2013.01)

(58) Field of Classification Search
CPC ........ A47J 43/281; A47J 43/282; A47G 21/04
USPC ....... 425/276, 277, 278, 279, 280, 281, 282, 425/283, 284, 285, 286; D7/681, 691
See application file for complete search history.

(56) References Cited

U.S. PATENT DOCUMENTS

| | | | |
|---|---|---|---|
| 864,550 A * | 8/1907 | Mosteller | A47J 43/282 425/281 |
| 1,246,032 A | 11/1917 | Bluhm | |
| 1,609,655 A * | 12/1926 | Martin | A47J 43/282 425/281 |
| 1,805,387 A | 5/1931 | Balton | |

(Continued)

FOREIGN PATENT DOCUMENTS

CN           108433487 A  *   8/2018   ............. A47G 21/04

OTHER PUBLICATIONS

International Search Report dated Oct. 21, 2019 and Written Opinion completed Sep. 16, 2019 corresponding to counterpart Int'l Patent Application PCT/US19/45212.

*Primary Examiner* — Timothy Kennedy
(74) *Attorney, Agent, or Firm* — Carter, DeLuca & Farrell, LLP; Francesco Sardone, Esq.

(57) ABSTRACT

A ladle includes a handle, a cup, a squeegee mechanism with a sweeping arm, a trigger assembly, and a handle of the trigger assembly which causes the operation of the squeegee mechanism. The handle has a proximal end configured for gripping by a user and a distal end. The cup is coupled to the distal end of the handle. The squeegee mechanism is associated with the handle and the cup. The squeegee mechanism includes a sweeping arm pivotally connected to the cup and disposed adjacent an exterior of the cup and a trigger assembly supported on the handle and connected to the sweeping arm. The trigger assembly is configured to actuate the squeegee mechanism to sweep the sweeping arm along the exterior of the cup.

18 Claims, 7 Drawing Sheets

(56) References Cited

U.S. PATENT DOCUMENTS

| | | | | |
|---|---|---|---|---|
| 1,826,818 | A | | 10/1931 | Palmer |
| 2,129,753 | A | * | 9/1938 | Wilhoit ................ A47J 43/282 425/284 |
| 2,714,862 | A | * | 8/1955 | Gargano ............... A47J 43/282 425/281 |
| 2,926,620 | A | | 3/1960 | Fried |
| 3,208,144 | A | * | 9/1965 | Cronheim ............. A47G 21/04 30/324 |
| 3,421,456 | A | * | 1/1969 | Weinstein ............. A47J 43/282 425/281 |
| D575,999 | S | | 9/2008 | Funka, Jr. |
| 8,911,142 | B1 | * | 12/2014 | Peoples .................. A47J 43/28 366/309 |

* cited by examiner

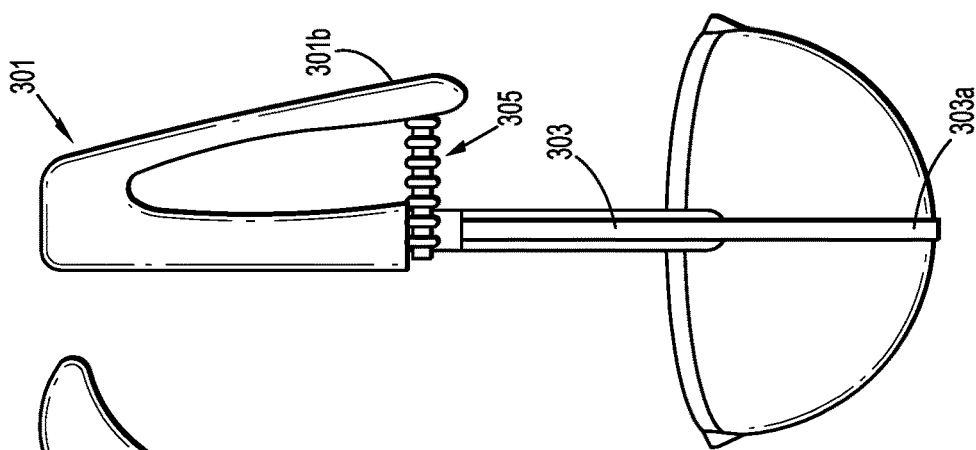
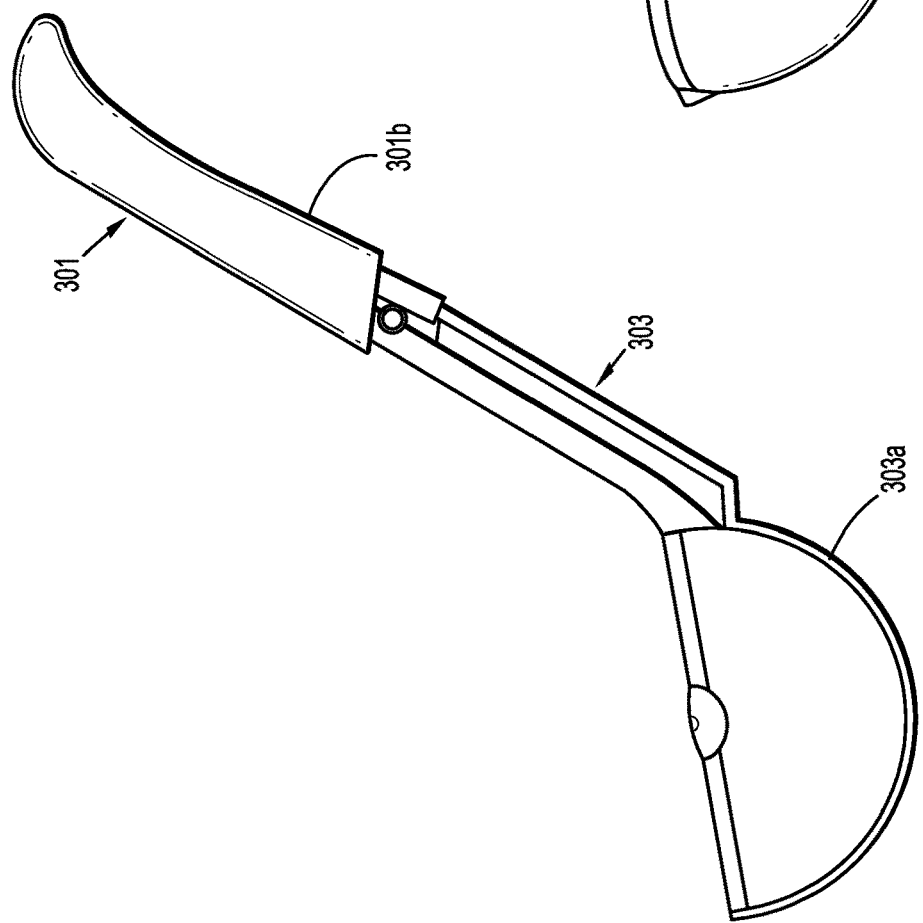
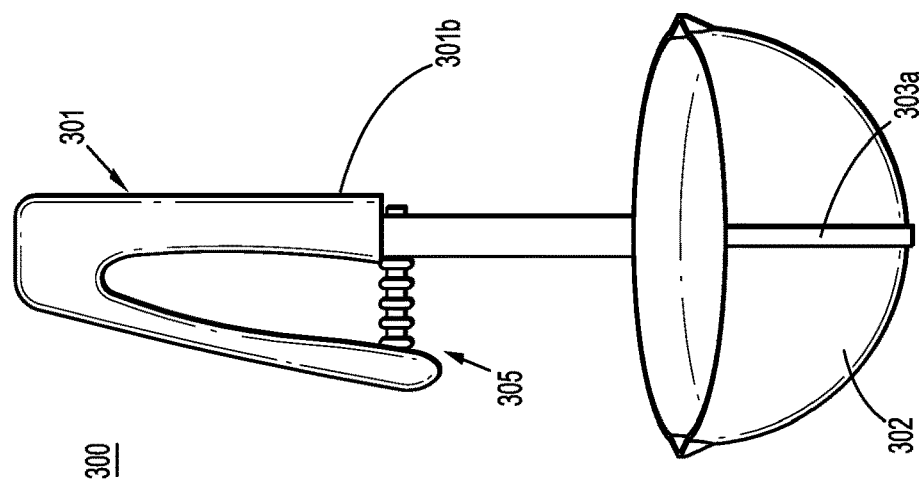

LADLE INCLUDING EXTERIOR SWEEPING SQUEEGEE ARM

CROSS-REFERENCE TO RELATED APPLICATION

The present application is a U.S. National Stage Application of PCT/US2019/045212, filed Aug. 6, 2019 under 35 USC § 371 (a), which claims the benefit of and priority to U.S. Provisional Patent Application Ser. No. 62/824,361 filed on Mar. 27, 2019, the disclosure of each of which is incorporated by reference herein in its entirety.

TECHNICAL FIELD

The present disclosure relates generally to a kitchen product. In particular, the present disclosure is directed to a ladle that may be used in connection to cooking with any type of liquid material or scoopable tacky material (e.g., batter, dough, gelatins, ice creams, etc.) for efficiently releasing a wiping the material therefrom.

BACKGROUND

Ladles have been used for centuries to scoop materials contained in one receptacle and to transport those scooped materials to another location for use thereof, whether for cooking, or changing storage locations, or for other types of processing. Over the years, ladles or scoopers including a reciprocating sweep arm located inside the cup of the ladle or scooper have been developed to facilitate release of the scooped material from the cup of the ladle.

However, during scooping and transporting of some types of materials or food products (e.g., relatively highly viscous fluids or the like), as the cup of the ladle is lifted out of the receptacle of the material, some material (e.g., batter, dough, gelatins, ice creams, etc.) clings to the exterior surface of the cup. As such, as the ladle is transported to a new location, inevitably, some material which is clinging to the exterior surface of the cup of the ladle will drip off of the cup and land anywhere along the path of transport (e.g., on a countertop, on a stove top, on the floor, etc.).

In view thereof, a need exists for a ladle, scooper or the like which helps to eliminate the incidents of dripping of fluid material and the like as the ladle is used to scoop and transport material from one location to another.

SUMMARY

The present disclosure is directed to a ladle that seeks to prevent any drips while transporting the material or liquid from, for example, a bowl to the cooking place, or the like.

In accordance with the present disclosure, there is provided a tool, in the form of a kitchen utensil, ladle or scooper. With reference to the attached figures the ladle includes a handle having a proximal end configured for gripping by a user, and a distal end. It is contemplated that the handle may be made of stainless steel, aluminum, polymers, silicones or the like.

The ladle also includes a cup coupled to the distal end of the handle. The cup may be substantially hemi-spherical, having a rim and an inner concavity for holding material. The cup may include at least one spout formed along the rim thereof. The cup may further include a first spout formed along the rim at a location substantially orthogonal to and at a maximum radial distance from a longitudinal axis of the ladle. The cup may also include a second spout formed along the rim at a location substantially orthogonal to and at a maximum radial distance from the longitudinal axis of the ladle. The first and second spouts may be disposed in opposed relation to one another.

In an aspect of the present disclosure, the ladle may include a squeegee mechanism associated with the handle and the cup. The squeegee mechanism may include a sweeping arm pivotally connected to the cup and disposed adjacent an exterior of the cup. The trigger assembly may be supported on the handle and connected to the sweeping arm. The trigger assembly may actuate the squeegee mechanism to sweep the sweeping arm along the exterior of the cup. It is contemplated that the sweeping arm may be made of stainless steel, aluminum, polymers, silicones, or the like.

The trigger assembly may be configured to, upon an actuation of a trigger, sweep the sweeping arm across the exterior surface of the cup. The trigger may be actuated by squeezing the handle of the trigger assembly. The sweeping of the sweeping arm across the outer surface of the cup may render the exterior surface of the cup substantially free of material sticking thereto.

In accordance with the present disclosure, the trigger assembly may include a pivot gear non-rotationally connected to the sweeping arm. The pivot gear may define an axis of rotation that is co-linear with a pivot axis of the sweeping arm. The trigger assembly may also include a rack gear in meshing engagement with the pivot gear. The rack gear may be actuatable by the trigger to effect a rotation of the pivot gear. The trigger of the trigger assembly may be spring-loaded to return the sweeping arm to a home position upon a release of the trigger.

In accordance with a second embodiment of the present disclosure, the squeegee mechanism may include a pair of sweeping arms pivotally connected to the cup. A first sweeping arm of the pair of sweeping arms may be the sweeping arm disposed adjacent the exterior of the cup. A second sweeping arm of the pair of sweeping arms may be disposed in an inner concavity of the cup. The first and second sweeping arms may be in registration with one another.

According to a further aspect of the disclosure, a ladle is provided having a handle, including a proximal end configured for gripping by a user; and a distal end; a cup coupled to the distal end of the handle; and a squeegee mechanism associated with the handle and the cup. The squeegee mechanism include a sweeping arm pivotally connected to the cup and disposed adjacent an exterior of the cup, whereby the sweeping arm is actuatable along the exterior of the cup to wipe the exterior of the cup.

The ladle may further include a trigger assembly supported on the handle and connected to the sweeping arm, the trigger assembly configured to actuate the squeegee mechanism to sweep the sweeping arm along the exterior of the cup.

The trigger assembly may be configured to, upon an actuation of a trigger, sweep the sweeping arm across the exterior surface of the cup, whereby the sweeping of the sweeping arm across the outer surface of the cup will render the exterior surface of the cup substantially free of material sticking thereto.

The squeegee mechanism may include a pair of sweeping arms pivotally connected to the cup. A first sweeping arm of the pair of sweeping arms may be the sweeping arm disposed adjacent the exterior of the cup, and a second sweeping arm of the pair of sweeping arms may be disposed in an inner concavity of the cup.

The sweeping arm may be made of stainless steel, aluminum, polymers or silicones.

The trigger assembly may include a pivot gear non-rotationally connected to the sweeping arm, wherein the pivot gear defines an axis of rotation that is co-linear with a pivot axis of the sweeping arm; and a rack gear in meshing engagement with the pivot gear, wherein the rack gear is actuatable by the trigger to effect a rotation of the pivot gear.

The trigger may be spring-loaded to return the sweeping arm to a home position upon a release of the trigger.

The cup may be substantially hemi-spherical defining a rim and an inner concavity for holding material.

The cup may include at least one spout formed along the rim thereof.

The cup may include a first spout formed along the rim at a location substantially orthogonal to and at a maximum radial distance from a longitudinal axis of the ladle; and a second spout formed along the rim at a location substantially orthogonal to and at a maximum radial distance from the longitudinal axis of the ladle, wherein the first and second spouts are disposed in opposed relation to one another.

Further, to the extent consistent, any of the aspects described herein may be used in conjunction with any or all of the other aspects described herein.

BRIEF DESCRIPTION OF THE FIGURES

Objects and features of the presently disclosed kitchen utensil will become apparent to those of ordinary skill in the art when descriptions of various embodiments thereof are read with reference to the accompanying drawings, of which:

FIG. 7 illustrates a frontal view of the ladle according to a third exemplary embodiment of the present disclosure;

FIG. 8 illustrates an angled side view of the ladle of FIG. 7; and

FIG. 9 illustrates a rear view of the ladle of FIGS. 7-8.

Figure 1:
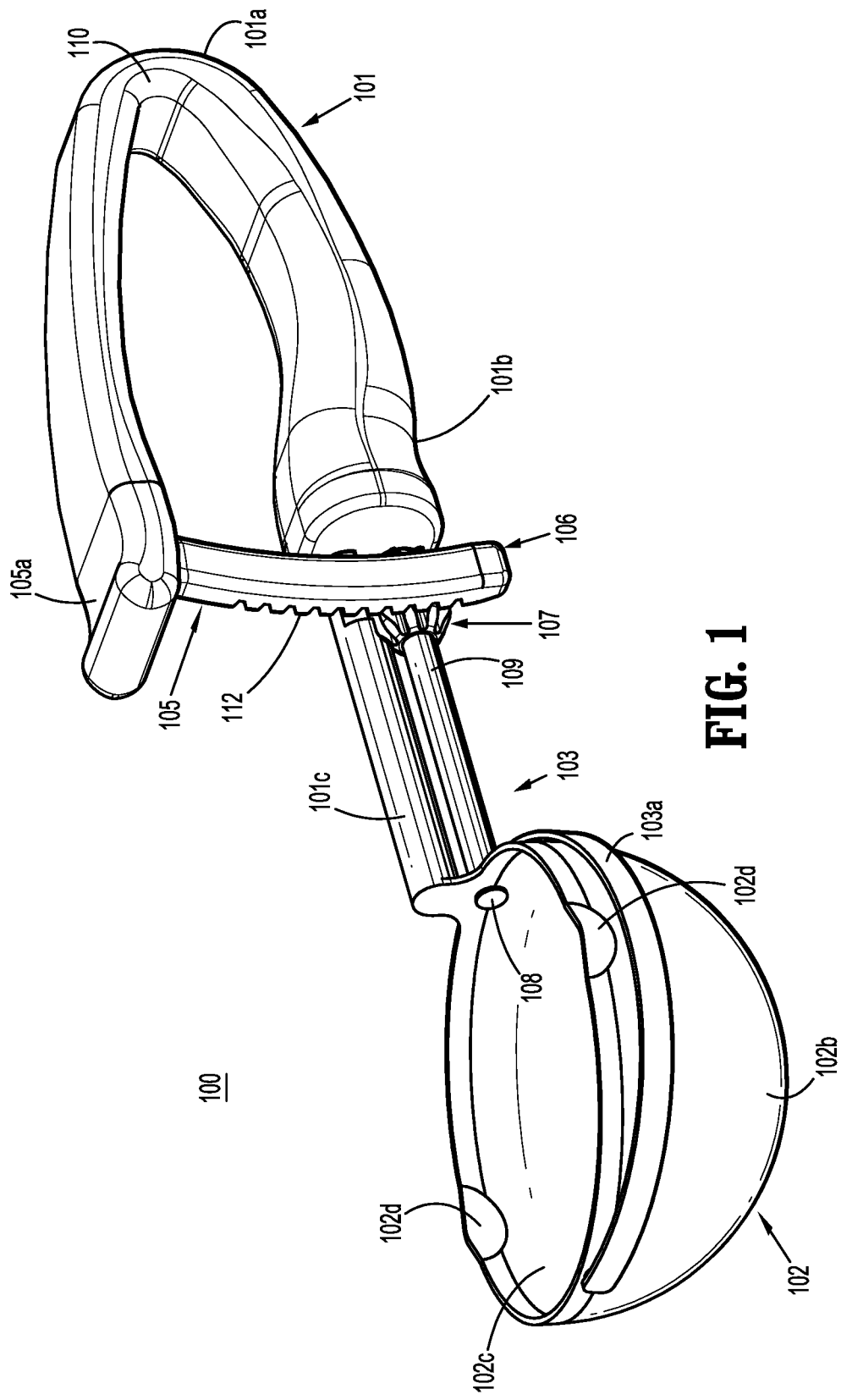
FIG. 1 illustrates a perspective view of the ladle according to a first exemplary embodiment of the present disclosure.
Figure 2:
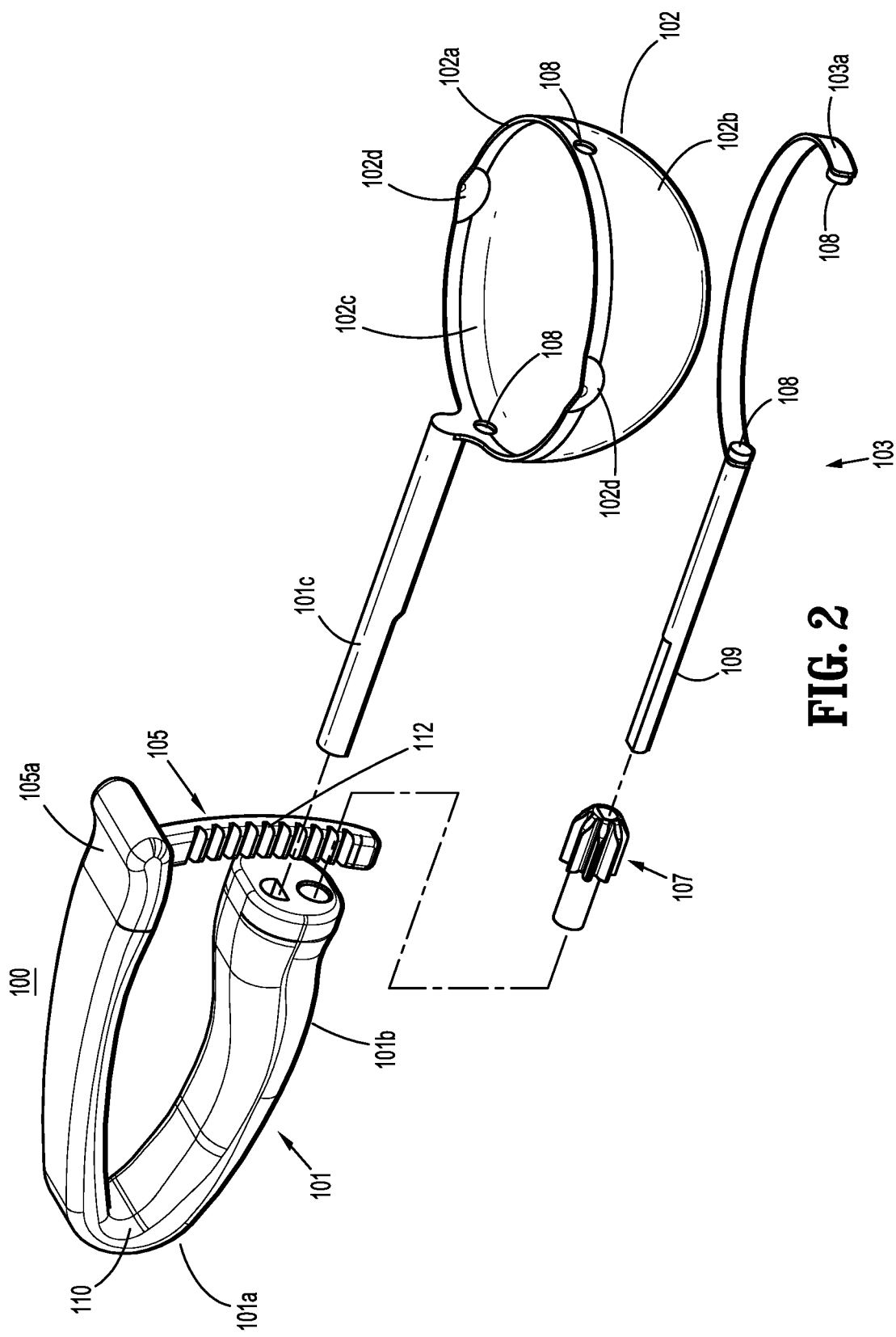
FIG. 2 illustrates an exploded perspective view of the ladle of FIG. 1.
Figure 3:
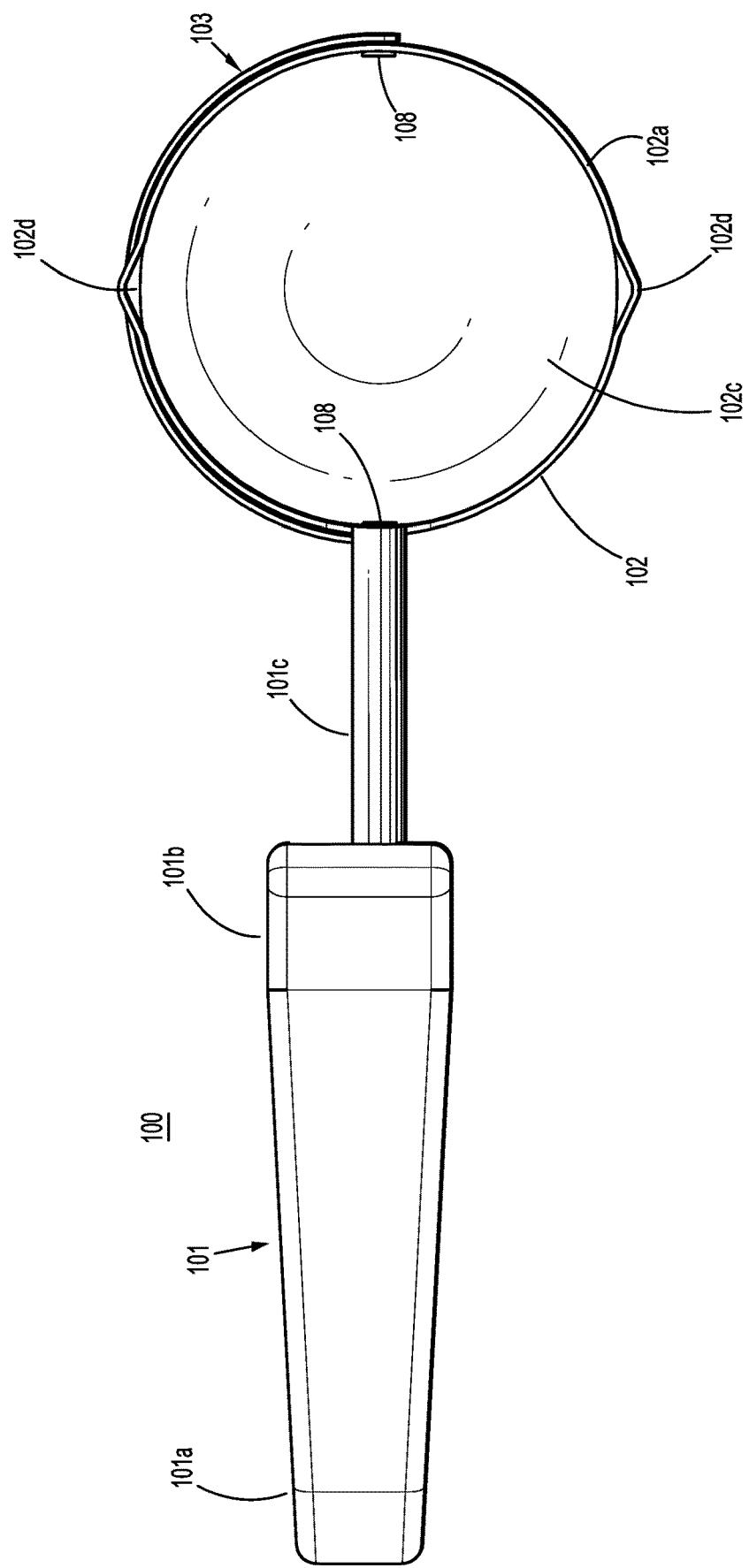
FIG. 3 illustrates a top view of the ladle of FIG. 1.
Figure 4:
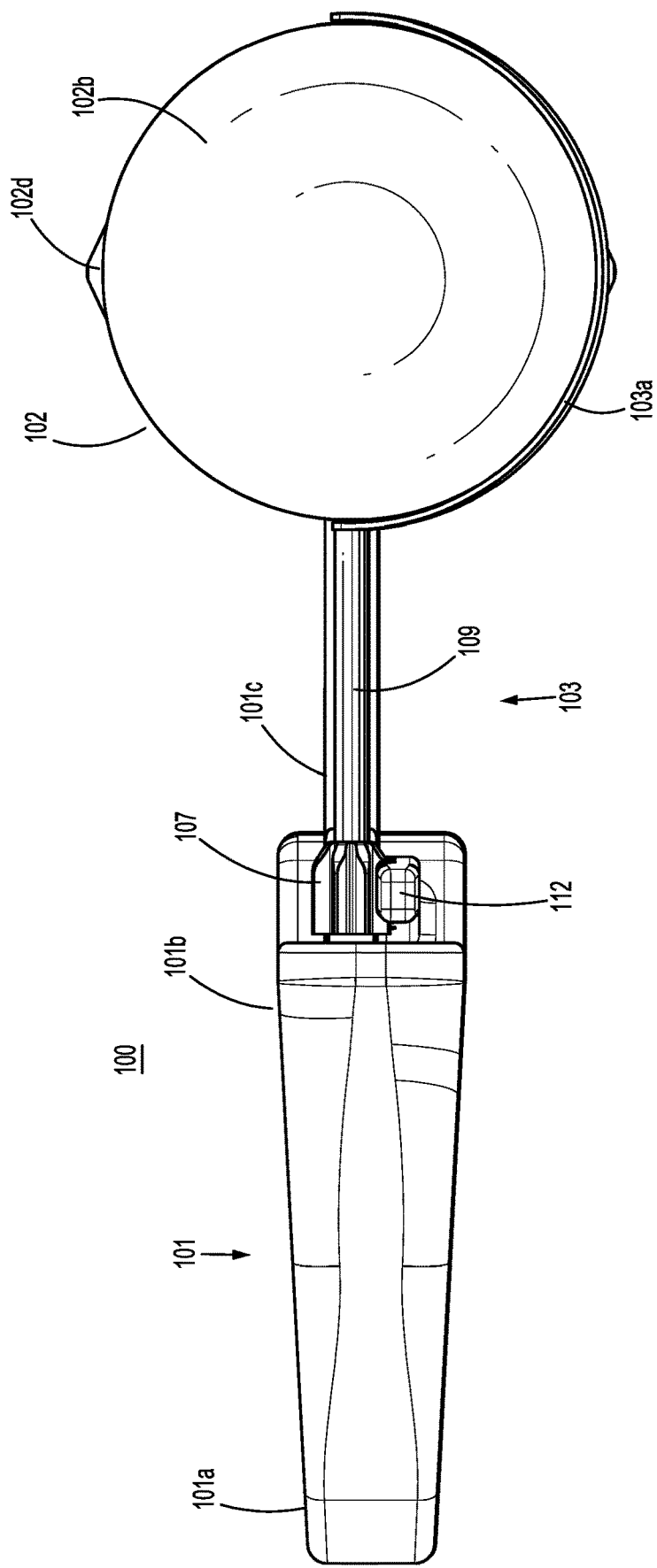
FIG. 4 illustrates a bottom view of the ladle of FIG. 1.

Further details and aspects of exemplary embodiments of the disclosure are described in more detail below with reference to the appended figures. Any of the above aspects and embodiments of the disclosure may be combined without departing from the scope of the disclosure.

DETAILED DESCRIPTION

As used herein, the term "distal" refers to the portion that is being described which is further from a user, while the term "proximal" refers to the portion that is being described which is closer to a user. Further, to the extent consistent, any of the aspects and features detailed herein may be used in conjunction with any or all of the other aspects and features detailed herein.

Exemplary embodiments of the present disclosure will be described more fully below (e.g., with reference to the accompanying drawings). Like reference numerals may refer to like elements throughout the specification and drawings. The terms "wiping mechanism," "sweeping mechanism" and "squeegee mechanism" may be used interchangeably herein.

This disclosure relates to a kitchen product, particularly a ladle that may be used in connection to cooking with any type of food-based material, whether liquid or semi-solid, such as, for example, batter, dough, gelatins, ice creams, etc. It is further contemplated that the ladle may be used in connection with non-food based material which are viscous, sticky or tacky in nature, such as, for example, oils, glues, waxes, polymers, silicones, etc.

With reference to FIGS. 1-5, a ladle 100, in accordance with a first embodiment of the present disclosure, includes a handle 101, a cup 102, a squeegee mechanism 103 with a sweeping arm 103a, and a trigger assembly 105 which causes the operation of the squeegee mechanism 103.

The handle 101 of ladle 100 includes a proximal end 101a configured for gripping by a user, and a distal end 101b configured to and supporting cup 102, via a support shaft 101c. According to an exemplary embodiment of the present disclosure, it is contemplated that the handle 101 may be made of stainless steel, aluminum, polymers (e.g., polypropylene), silicones, or the like. The cup 102 may be substantially hemi-spherical having a rim 102a, an outer or exterior surface 102b, and defining an inner concavity 102c for holding material therein. It is contemplated that the cup 102 may be made of stainless steel, aluminum, polymers, silicones or the like.

In various embodiments of the present disclosure, the cup 102 may include at least one spout 102d formed in an edge thereof, such as, for example, along rim 102a. For example, the cup 102 may include a first spout 102d formed along the rim at a location substantially orthogonal to and a maximum radial distance from a longitudinal axis of the ladle. The cup 102 may further include a second spout 102d formed along the rim at a location substantially orthogonal to and a maximum radial distance from a longitudinal axis of the ladle, with the first and second spouts 102d being in opposed relation to one another, and on equidistant opposite sides of the handle 101.

With continued reference to FIGS. 1-5, a ladle 100 includes a squeegee mechanism 103 associated with the handle 101 and the cup 102. The squeegee mechanism 103 includes a sweeping arm 103a pivotally connected to the cup 102 and disposed on/or along the exterior surface 102b of the cup 102. The sweeping arm 103a may be pivotally connected to the cup 102 by at least two pivot points 108. Pivot points 108 may be in opposed relation to one another, and on equidistant opposite sides in/or along the inner concavity 102c of the cup 102.

The sweeping arm 103a is shaped to closely compliment the outer profile of the outer surface 102b of the cup 102. It is contemplated that the sweeping arm 103a may be made of stainless steel, aluminum, polymers, silicones or the like. The squeegee mechanism 103 may extend distally from the trigger assembly 105 in a substantially straight manner. The squeegee mechanism 103 distally extends and remains parallel to the distal end 101b of the handle 101.

Trigger assembly 105 may be supported on the handle 101 and connected to the sweeping arm 103a of the squeegee mechanism 103 and sweeping arm 103a. Generally, in use, actuation of the trigger assembly 105 results in the sweeping arm 103a of the squeegee mechanism 103 sweeping across the outer surface 102b of the cup 102.

More specifically, the trigger assembly 105 includes a trigger 105a that may be supported on the handle 101 and is operatively connected to the sweeping arm 103a of the squeegee mechanism 103 such that an actuation of the trigger 105a causes the squeegee mechanism 103 to operate. By way of example, a user may squeeze the trigger 105a of the trigger assembly 105 to operate the squeegee mechanism 103. The squeegee mechanism 103 causes the sweeping arm 103a to sweep across the exterior or outer surface 102b of the cup 102, wherein the sweeping of the sweeping arm 103a across the exterior or outer surface 102b of the cup 102 will render the exterior or outer surface of the cup 102b substantially free of material sticking thereto.

Figure 5:
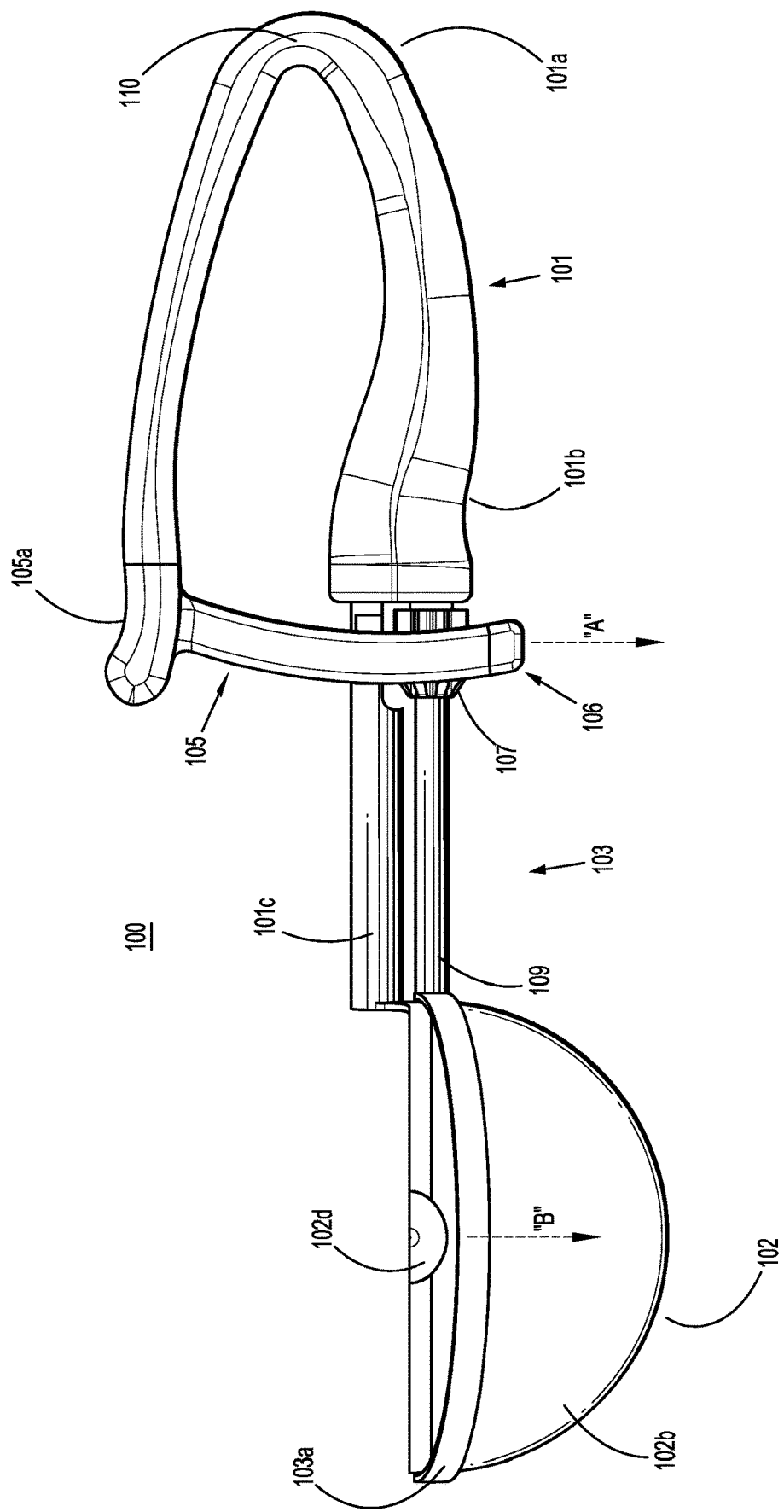
FIG. 5 illustrates a side view of the ladle of FIG. 1.

With particular reference to FIG. 5, the trigger assembly 105 may include a gear system 106. The gear system 106 having a pivot gear 107 and a rack gear 112. Pivot gear 107 may be non-rotationally connected to sweeping arm 103a via a drive shaft 109. The pivot gear 107 may define an axis of rotation that is co-linear with a pivot axis of the sweeping arm 103a. The pivot gear 107 may be in meshing engagement with rack gear 112. Rack gear 112 may extend from trigger 105a and be actuatable by the trigger 105a to effect a rotation of pivot gear 107, which rotation, in turn, actuates the squeegee mechanism 103, causing the sweeping arm 103a to sweep across the exterior or outer surface 102b of the cup 102. Rack gear 112 is located at a distal end or portion of trigger 105a and extends therefrom an amount sufficient to engage pivot gear 107.

The trigger assembly 105 may be spring-loaded to return the sweeping arm 103a to a home position. Specifically, a biasing member 110 may be provided for returning trigger 105a to an unactuated position and thereby return sweeping arm 103a to an unactuated position. Biasing member 110 may be a resilient hinge interconnecting the proximal end 101a of the handle 101 to the trigger 105a of the trigger assembly 105 thereby forming an elbow or the like therebetween. It is contemplated that the handle 101, trigger assembly 105 (including trigger 105a and rack gear 112) and biasing member 110 is formed as a single, monolithic construction or may otherwise be formed or assembled as a unitary structure. It is contemplated that the single, monolithic construction may be made of stainless steel, aluminum, polymers, silicones or the like. Biasing member 110 functions to maintain trigger 105a spaced a distance from handle 101 and to return trigger 105a to a fully unactuated condition upon the release or removal of squeezing forces therefrom.

In use, as trigger assembly 105 is actuated (e.g., trigger 105a is approximated towards handle 101), rack gear 112 is translated relative to pivot gear 107 (in the direction of arrow "A"). As rack gear 112 is translated relative to pivot gear 107, pivot gear 107 is caused to be rotated, which in turn, causes sweeping arm 103a of squeegee mechanism 103 to sweep across the exterior surface of the cup 102 (in the direction of arrow "B"). Additionally, as trigger 105a is approximated towards handle 101, biasing member 110 is caused to be actuated and thus, upon a release or removal of squeezing forces from trigger 105a, biasing member 110 forces trigger 105a to return to a fully unactuated condition, whereby sweeping arm 103a of squeegee mechanism 103 is caused to sweep back across the exterior surface of the cup 102.

Figure 6:
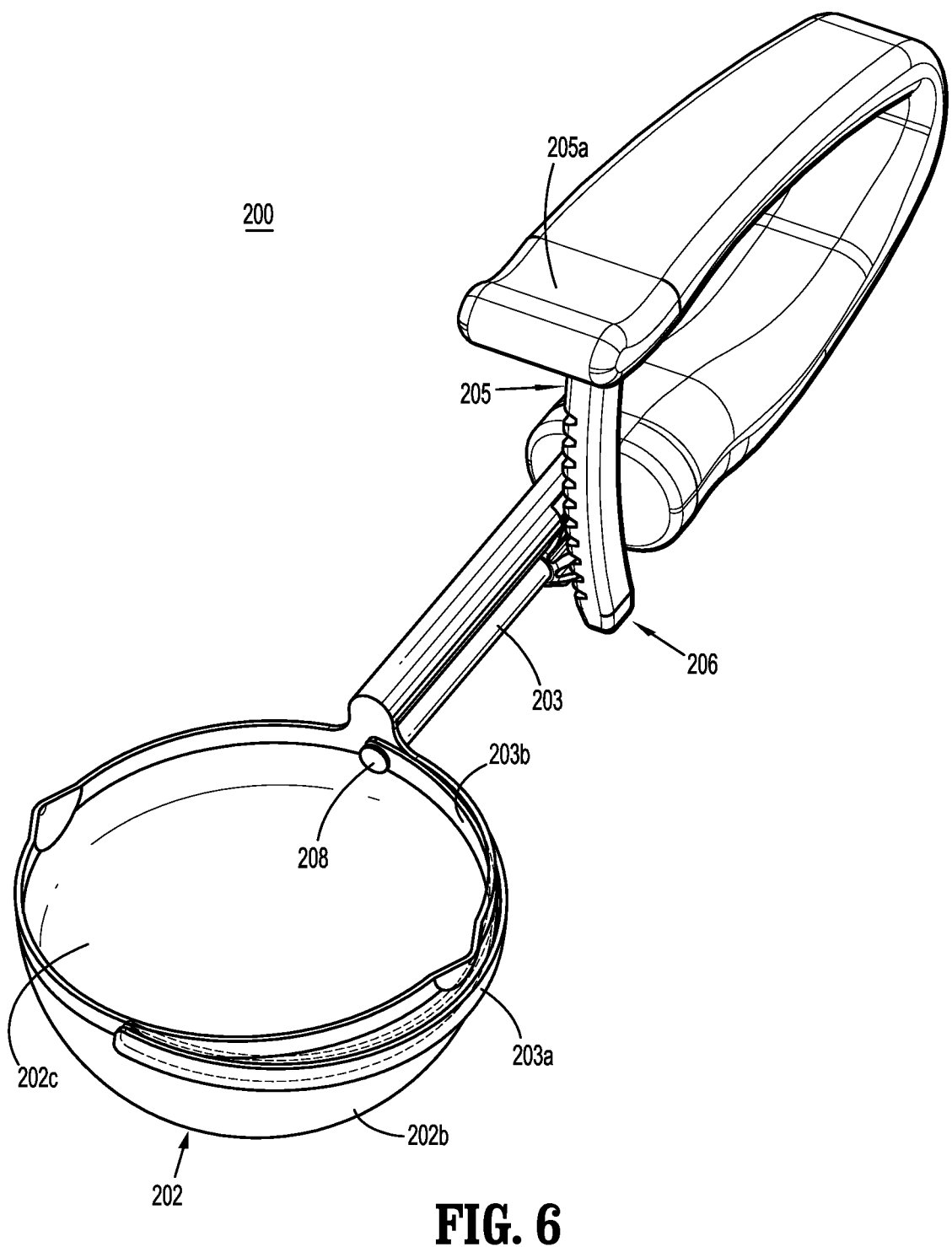
FIG. 6 illustrates a perspective view of the ladle according to a second exemplary embodiment of the present disclosure.

Referring to FIG. 6, a ladle 200, in accordance with a second embodiment of the present disclosure, includes a handle 201, a cup 202, a squeegee mechanism 203 with a plurality of sweeping arms 203a, 203b, and a trigger assembly 205 which causes the operation of the squeegee mechanism 203.

Specifically, squeegee mechanism 203 may include a first sweeping arm 203a disposed adjacent the exterior surface 202b of cup 202, and a second sweeping arm 203b pivotally connected to cup 202 and disposed in the inner concavity 202c of the cup 202. The first and second sweeping arms 203a, 203b may be in registration with one another. The trigger assembly 205 may be further configured to actuate the squeegee mechanism 203 to sweep the first and second sweeping arms 203a, 203b along the exterior surface 202b and the inner concavity 202c of the cup 202, thereby releasing any material from within inner concavity 202c of the cup 202, and also wiping the material from the exterior surface 202b of the cup 202. Pivot points 208 may be used to pivotally connect the plurality of sweeping arms 203a, 203b to the cup 202.

Referring to FIGS. 7-9, a ladle 300, in accordance with a third embodiment of the present disclosure, includes a handle 301, a cup 302, a squeegee mechanism 303 with a sweeping arm 303a, and a trigger assembly 305 which causes the operation of the squeegee mechanism 303.

The squeegee mechanism 303 may extend distally from the trigger assembly 305 in an angled manner. The squeegee mechanism 303 may extend distally and remains parallel to the distal end 301b of the handle 301. However, when the squeegee mechanism 303 encroaches the cup 302, the squeegee mechanism 303 forms an obtuse angle, thereby creating space between the handle 301 of the ladle 300 and the squeegee mechanism 303.

Although embodiments have been described in detail with reference to the accompanying drawings for the purpose of illustration and description, it is to be understood that the inventive processes and apparatus are not to be construed as limited thereby. It will be apparent to those of ordinary skill in the art that various modifications to the foregoing embodiments may be made without departing from the scope of the disclosure as set forth in the following claims.

The invention claimed is:

1. A ladle, comprising:
    a handle, including:
        a proximal end configured for gripping by a user; and
        a distal end;
    a cup coupled to the distal end of the handle; and
    a squeegee mechanism connected to the handle and being in contact with the cup, wherein the squeegee mechanism includes:
        a sweeping arm pivotally connected to the cup and disposed adjacent an exterior of the cup; and
        a trigger assembly supported on the handle and connected to the sweeping arm, the trigger assembly configured to actuate the squeegee mechanism to sweep the sweeping arm along the exterior of the cup.

2. The ladle of claim 1, wherein the cup may be substantially hemi-spherical defining a rim and an inner concavity for holding material.

3. The ladle of claim 2, wherein the cup includes at least one spout formed along the rim thereof.

4. The ladle of claim 3, wherein the cup includes:
    a first spout formed along the rim at a location substantially orthogonal to and at a maximum radial distance from a longitudinal axis of the ladle; and
    a second spout formed along the rim at a location substantially orthogonal to and at a maximum radial distance from the longitudinal axis of the ladle, wherein the first and second spouts are disposed in opposed relation to one another.

5. The ladle of claim 1, wherein the trigger assembly is configured to, upon an actuation of a trigger, sweep the sweeping arm across the exterior surface of the cup, whereby the sweeping of the sweeping arm across the outer surface of the cup will render the exterior surface of the cup substantially free of material sticking thereto.

6. The ladle of claim 1, wherein the trigger assembly includes:
   a pivot gear connected to the sweeping arm, wherein the pivot gear defines an axis of rotation that is co-linear with a pivot axis of the sweeping arm; and
   a rack gear in meshing engagement with the pivot gear, wherein the rack gear is actuatable by the trigger assembly to effect a rotation of the pivot gear.

7. The ladle of claim 6, wherein the trigger is spring-loaded to return the sweeping arm to a home position upon a release of the trigger.

8. The ladle of claim 1, wherein the squeegee mechanism includes a pair of sweeping arms pivotally connected to the cup, a first sweeping arm of the pair of sweeping arms being the sweeping arm disposed adjacent the exterior of the cup, and a second sweeping arm of the pair of sweeping arms being disposed in an inner concavity of the cup.

9. The ladle of claim 1, wherein the sweeping arm is made of stainless steel, aluminum, polymers, or silicones.

10. A ladle, comprising:
    a handle defining a longitudinal axis, the handle including:
       a proximal end configured for gripping by a user; and
       a distal end;
    a cup coupled to the distal end of the handle;
    a squeegee mechanism connected to the handle and being in contact with the cup, wherein the squeegee mechanism includes:
       a sweeping arm pivotally connected to the cup and disposed adjacent an exterior of the cup, wherein a pivot axis of the sweeping arm is parallel to the longitudinal axis of the handle, whereby the sweeping arm is actuatable along the exterior of the cup to wipe the exterior of the cup; and
    a trigger assembly supported on the handle and connected to the sweeping arm, the trigger assembly configured to actuate the squeegee mechanism to sweep the sweeping arm along the exterior of the cup.

11. The ladle of claim 10, wherein the trigger assembly is configured to, upon an actuation of a trigger, sweep the sweeping arm across the exterior surface of the cup, whereby the sweeping of the sweeping arm across the outer surface of the cup will render the exterior surface of the cup substantially free of material sticking thereto.

12. The ladle of claim 10, wherein the squeegee mechanism includes a pair of sweeping arms pivotally connected to the cup, a first sweeping arm of the pair of sweeping arms being the sweeping arm disposed adjacent the exterior of the cup, and a second sweeping arm of the pair of sweeping arms being disposed in an inner concavity of the cup.

13. The ladle of claim 10, wherein the sweeping arm is made of stainless steel, aluminum, polymers, or silicones.

14. The ladle of claim 11, wherein the trigger assembly includes:
   a pivot gear connected to the sweeping arm, wherein the pivot gear defines an axis of rotation that is co-linear with a pivot axis of the sweeping arm; and
   a rack gear in meshing engagement with the pivot gear, wherein the rack gear is actuatable by the trigger assembly to effect a rotation of the pivot gear.

15. The ladle of claim 14, wherein the trigger is spring-loaded to return the sweeping arm to a home position upon a release of the trigger.

16. The ladle of claim 10, wherein the cup may be substantially hemi-spherical defining a rim and an inner concavity for holding material.

17. The ladle of claim 16, wherein the cup includes at least one spout formed along the rim thereof.

18. The ladle of claim 17, wherein the cup includes:
   a first spout formed along the rim at a location substantially orthogonal to and at a maximum radial distance from a longitudinal axis of the ladle; and
   a second spout formed along the rim at a location substantially orthogonal to and at a maximum radial distance from the longitudinal axis of the ladle, wherein the first and second spouts are disposed in opposed relation to one another.

\* \* \* \* \*